United States Patent Office 2,797,198
Patented June 25, 1957

2,797,198
SOLID FOAM-COMBATING COMPOSITION

Fred L. Chappell, Jr., Kalamazoo, Mich., assignor to Hercules Powder Company, Wilmington, Del., a corporation of Delaware No Drawing. Application April 29, 1954,
Serial No. 426,565

12 Claims. (Cl. 252—358)

This invention relates to a solid water-dispersible defoaming composition for the prevention and reduction of foam in rosin size alum systems in the papermaking industry.

In many industries, and in particular in the papermaking industry, the formation of foam during the operating processes constitutes a problem which has been difficult of solution. British Patent 429,423 discloses that higher fatty alcohols, particularly in conjunction with a dispersing agent to improve the degree and rapidity of dispersion of the alcohol, are highly efficient agents to prevent foam in the papermaking system. Unfortunately these compositions suffer from a number of disadvantages for use in such a system. Thus, these compositions had relatively low melting points so that on warm days the composition could be anything from a mush to a liquid. The use of neutral materials compatible with the alcohol, such as paraffin oil, as extenders for the alcohols to lower the high cost of the compositions generally lowered the melting point of the compositions to further aggravate the situation. This introduced grave storage, shipment and handling difficulties. Furthermore, higher alcohols have a deleterious effect on sizing which is disadvantageous in the papermaking system.

Now in accordance with the present invention a defoaming composition has been discovered which is far superior to the compositions of the British patent as respects packaging, storage and handling, has greatly minimized the deleterious effect on sizing, and while accomplishing all of this, has vastly improved the defoaming efficiency of the composition, while at the same time lowering the cost of the product. The defoaming composition of the present invention, which is particularly adapted for the paper industry, comprises a water-dispersible solid block of unit amount containing a higher aliphatic alcohol having a carbon chain of about 14 to 25 carbon atoms which is solid at room temperature and has a melting point below 100° C., no more than the weight of the alcohol of a dispersing agent, and from about 3% to about 25% of the total weight of the composition of a higher aliphatic acid having a carbon chain of about 14 to 25 carbon atoms which is solid at room temperature and has a melting point below 100° C., these ingredients being uniformly intermixed. The ingredients may suitably be mixed together, preferably in the molten state, which molten state is achieved at temperatures below 100° C. and then allowed to cool to yield a uniform solid mixture which is characterized by being readily dispersible in water at temperatures above the melting point of the mixture.

Fatty acids themselves are highly inefficient in foaming compositions, being only one-tenth or even less efficient than the corresponding fatty alcohols in reducing foam in the papermaking system. However, it has been discovered, surprisingly enough, that the addition of from about 3% to about 25%, based on the total weight of the composition, of fatty acids in the composition of the present invention, instead of lowering the defoaming efficiency of the fatty alcohols, greatly increases the defoaming efficiency in this system.

Further, due to the higher melting point of the acid over the alcohol with a consequent reduced danger of melting during storage and shipment in hot weather, it is possible with the compositions of the present invention to package the defoamer in a disposable paper container in unit blocks. This form of packaging has many advantages. First, is the greatly lower cost of paper compared to a drum which was needed to package the higher alcohols of the British patent. Second, is the greater ease of storage due to the rectangular form of the solid block as compared to the cylindrical form of the drum. Third, is the fact that the paper container is disposed of after use and is not stored to be returned empty to the shipper, and fourth, drums, due to their size, necessarily contain vastly more defoamer than would be used in one operation in the paper mill. Thus, the defoamer would have to be removed from the drum and each portion weighed before being used. In contrast the paper-packaged blocks of the instant defoamer, as stated above, are packaged in blocks of unit amount, thereby permitting direct administration of the block to the paper system without any preliminary weighing step. Unlike the alcohols, fatty acids are themselves sizing agents. Therefore, the substitution of solid fatty acids for higher alcohols greatly reduces any tendency of the alcohol to impair sizing.

According to the preferred embodiment of the invention, a higher primary aliphatic alcohol having a carbon chain of 14 to 25 carbon atoms, and preferably being a mixture of the higher fatty alcohols containing predominantly 16 to 18 carbon chain alcohols, is mixed with a higher aliphatic acid having a carbon chain of about 14 to 25 carbon atoms, and preferably being a mixture of fatty acids containing predominantly 16 to 18 carbon chain acids, and is mixed with a dispersing agent which may be a water-soluble basic compound capable of reacting at least partially with the fatty acid, the amount of water-soluble basic compound being such that the free fatty acid remaining in the composition is from about 3% to about 25% based on the total weight of the composition. These ingredients, for example, in the proportion of about 60% by weight of alcohol, such as cetyl alcohol or stearyl alcohol, about 8.5 parts by weight of a water-soluble amine, such as, for example, triethanolamine, and about 31.5 parts by weight of a higher acid, for example, stearic acid or mixtures of stearic acid and palmitic acid, are mixed together to form a composition containing about 60% by weight of alcohol, about 15% by weight of free acid, and about 25% by weight of dispersing agent. The product is then subdivided into uniform solid pieces such as lumps, blocks or briquettes of unit weight which are suitable for direct addition to and mixing with unit volumes of water to yield a highly effective dilute foam-killing dispersion. It is apparent therefore that this invention comprises a solid mixture of the foam-killing composition in the form of individual pieces of unit weight which are convenient for packaging and shipping and are particularly adapted for easy and ready use in operating procedures by direct addition to and dispersion in measured quantities of water.

The general nature of the invention having been set forth the following examples are presented in illustration but not in limitation of preferred means and methods of carrying out the invention. All parts and percentages are by weight unless otherwise indicated.

Example 1

There were mixed together 8.46 parts of triethanolamine and 31.54 parts of a higher fatty acid mixture consisting predominantly of about 61% stearic acid, about 27% palmitic acid, with relatively lesser amounts of other fatty acids including oleic acid and myristic acid. The fatty acid and the amine were melted and mixed until substantially all of the amine was reacted to yield the fatty acid soap. To this reaction mixture there was added 60 parts by weight of a higher aliphatic alcohol consisting predominantly of about 85% to 90% cetyl alcohol together with lesser amounts of myristyl alcohol, stearyl alcohol, palmitoleyl alcohol, and oleyl alcohol, said composition having a meting point of about 49° to 52° C. The mixture was heated and mixed until uniform and then cooled to yield a solid product. The solid mixture was subdivided into pieces of unit weight, for example, of a weight of about 1 to 2 pounds per piece.

A block or briquette of the solid defoaming composition thus prepared was dispersed with vigorous agitation in hot soft water to yield a dispersion containing about 0.75% total defoaming composition. The resulting composition containing 0.75% of the defoaming agent was suited to be added to the desired point in an operating procedure, for example, to a papermaking process at or prior to the stage where troublesome foam was being produced.

As an indication of the comparative degree of efficiency of this composition in preventing or reducing foam, the following test procedure was devised and is presented. Elementarily simple test equipment may consist of a mixer or beater used to agitate about 1 liter of a test solution, and the defoaming efficiency of the composition is determined in terms of the amount thereof needed to reduce the degree of foaming to an arbitrarily established limit. The test solution is prepared by mixing 15 parts of a 3% resin soap with 960 parts of distilled water and 9 parts of a 3% solution of filtered papermaker's alum. For control purposes, a standard speed of mixer rotation is set at 640–644 R. P. M. with an egg beater type of agitator. Immediately prior to the test, a small quantity of 0.75% dispersion of the defoaming agent is added to the test solution and the mixing then commenced and continued for 4 minutes. The end point which has been chosen is that quantity of foam killer solution which controls foaming to the extent that the foam on the surface of the test mixture covers most, but not quite all, of the surface of the test solution 10 seconds after the agitation ceased, a like degree of foam being chosen in all cases to give comparable and meaningful results. For the defoamer described in this example, 0.04 cc. of the defoamer was sufficient to reach the end point when added to a mixture of 15 cc. of the 3% resin soap solution, 960 cc. of distilled water and 9 cc. of the 3% papermaker's alum solution.

*Examples 2 through 18*

The procedure of Example 1 was followed to prepare and evaluate various defoamer compositions. The various alcohols, in most cases, were mixtures predominantly of the ingredients named and optionally containing minor amounts of related alcohols and were employed together with varying amounts of the higher fatty acid of Example 1. Except in Example 9, the dispersing agent in each case was the triethanolamine soap of a mixture of fatty acids consisting principally of stearic acid and was identical with the soap used in Example 1. The compositions were prepared as in Example 1. The products were dispersed in water as indicated in Example 1 and were subjected to the test procedure set forth to indicate the comparative defoaming efficiency of the various compositions. The terms "octadecyl" and "stearyl" in the following table are used to indicate alcohols from two different sources. No analysis of the "octadecyl" alcohol was made. The "stearyl" alcohol, however, was found to consist of about 77% stearyl alcohol and about 21% cetyl alcohol.

| Example No. | Alcohol | Percent Alcohol | Percent Fatty Acid | Percent Soap | End Point (cc. 0.75% Dispersion) |
|---|---|---|---|---|---|
| 2 | None | None | 75 | 25 | 5.00+ |
| 3 | Cetyl | 75 | None | 25 | 0.125 |
| 4 | Octadecyl | 75 | None | 25 | 0.15 |
| 5 | Cetyl | 72 | 3 | 25 | 0.08 |
| 6 | do | 60 | 15 | 25 | 0.04 |
| 7 | Stearyl | 60 | 15 | 25 | 0.04 |
| 8 | do | 55 | 20 | 25 | 0.10 |
| 9 | Cetyl | 60 | 15 | ¹25 | 0.05 |
| 10 | do | 60 | 15 | 25 | 0.04 |
| 11 | do | 60 | 15 | 25 | 0.06 |
| 12 | do | 60 | 15 | 25 | 0.04 |
| 13 | do | 60 | 15 | 25 | 0.04 |
| 14 | do | 60 | 15 | 25 | 0.05 |
| 15 | do | 60 | 15 | 25 | 0.04 |
| 16 | do | 60 | 15 | 25 | 0.05 |
| 17 | do | 60 | 15 | 25 | 0.04 |
| 18 | do | 60 | 15 | 25 | 0.04 |

¹ Triethanolamine soap of cottonseed fatty acids.

*Example 19*

The defoamer composition of Example 7 was divided into two lots, one being kept as a control. One hundred parts of the other lot were melted and to this was added 10 parts of a molten nonionic dispersing agent consisting of an ethylene oxide adduct of rosin sold by the Hercules Powder Company under the trade name "Synthetics AR150." The defoamer was then cooled, giving a solid block. Both defoamers were then evaluated using the procedure of Example 1. The defoamer containing the additional nonionic dispersing agent showed marked improvement in defoaming properties over the control.

*Examples 20–22*

The procedure of Example 1 was followed to prepare and evaluate various defoamer compositions. The defoamer of Example 20 was identical with that of Example 7. Example 21 used 60% stearyl alcohol, 15% of a higher fatty acid mixture consisting predominantly of about 50% palmitic acid, about 45% stearic acid and about 5% of unsaturated acids, mainly oleic. The dispersing agent was the triethanolimine soap of this particular mixture of fatty acids and comprised 25% of the weight of the composition. Example 22 consisted of 60% stearyl alcohol, 15% of a higher fatty acid mixture consisting of about 40% palmitic acid and 40% stearic acid, 7% myristic acid, 7% of higher saturated acids and 6% of unsaturated acids, mainly oleic, together with 25% of a dispersing agent which was the triethanolamine soap of the same mixture of fatty acids. These compositions were prepared exactly as in Example 1, dispersed in water as indicated in Example 1, and were subjected to the test procedure set forth to indicate the comparative defoaming efficiency of the various compositions. Each end point was checked four times. In Example 20, 0.05 ml. of the 0.75% dispersion was needed for the end point, while in Examples 21 and 22 each required 0.04 ml. of their 0.75% dispersions.

*Examples 23 through 31*

The procedure of Example 1 was followed to prepare and evaluate various defoamer compositions. The composition of Example 23 was identical with that of Example 7. The compositions of Examples 24 through 31 were identical with that of Example 7 with the exception of the alkaline material used in preparing the soap. Thus, Example 23 consisted of 60% of a mixture of higher fatty alcohols consisting predominantly of stearyl alcohol, 15% by weight of a mixture of higher fatty acids consisting predominantly of stearic acid and 25% by weight of the triethanolamine soap of the mixture of fatty acids consisting predominantly of stearic acid used for the free fatty acid. The compositions of the remaining examples, as stated, were identical with this with the exception of the alkaline agent used in preparing the soap. These compositions were prepared as in Example 1 with the exception of Example 25. In this example the dry potassium hydroxide was added directly to the molten fatty alcohol—fatty acid mixture together with sufficient water to dissolve the potassium hydroxide. The solid briquette prepared from this particular defoamer composition of Example 25 contained some water but nevertheless was a solid composition of relatively high melting point and had a lighter color than any of the other defoamer compositions evaluated.

The following alkaline materials were used in preparing the soaps of the different examples: Example 24 used diethylenetriamine; Example 25 used potassium hydroxide; Example 26 used ethyl ethanolamine; Example 27 used triethylamine; Example 28 used aminoethanolamine; Example 29 used methyl diethanolamine; Example 30 used 2-amino-2-methyl-1 propanol; and Example 31 used diethanolamine. These products were dispersed in water as indicated in Example 1 and were subjected to the test procedure set forth to indicate the comparative defoamer efficiency of the various compositions with one exception in that the R. P. M. of the mixer or beater was from 34 to 39. In each instance, the defoamer composition had a defoaming efficiency, as measured by the number of cc.'s of their 0.75% dispersion necessary to reach the end point, equal to that of Example 23 used as the control.

The predominant member of the composition according to this invention is essentially a higher alcohol and is characterized by having a carbon configuration or chain of from 14 to 25 carbon atoms and preferably from 16 to 18 carbon atoms. The alcohols included are generally in the class of materials solid at normal or room temperatures and having melting points less than about 100° C., and it should be realized that the alcohol may be a mixture of two or more such alcohols wherein the mixture of the two alcohols likewise is solid at room temperature and has a melting point below about 100° C.

The second ingredient of the invention is a higher solid fatty acid characterized by being compatible with the alcohol and by having a melting point above room temperature. Included in this group are the higher aliphatic acids such as stearic acid, myristic acid, palmitic acid, behenic acid, and the like, generally being acids having from about 14 to 25 carbon atoms, and preferably about 16 to 18 carbon atoms. This higher aliphatic acid is employed in a minor amount, namely, from about 3% to about 25%, based on the total weight of the composition.

The other essential ingredient of the solid defoaming composition is a dispersing or emulsifying agent. Broadly described the present invention includes the use of any dispersing or emulsifying agent known to the art as such. Thus the following may be used:

Anionic types:
Alcohol sulfates such as sodium lauryl sulfate
Alkylaryl sulfonates such as sodium dodecylbenzene sulfonate
Sulfonated amides such as the sodium salt of N-oleyl methyltaurine
Sulfonated esters such as $RCOOCH_2SO_3H$ where R is $C_{12-18}$
Alkali metal soaps of higher fatty acids such as the conventional soaps formed by saponifying natural oils
Amine soaps of higher fatty acids such as triethanolamine stearate
Alkali metal soaps of resin acids such as sodium rosinate Nonionic types:
Polyethylene glycol ethers of long chain fatty alcohols such as "Emulphor ON"
Polyethylene glycol esters of long chain fatty acids such as polyethylene glycol stearate Cationic types:
Alkyl dimethyl benzyl ammonium chlorides The dispersing or emulsifying agent is employed in the composition of this invention in amounts of no more than the weight of the alcohol, and preferably, amounts up to about 50% of the weight of the alcohol. The exact amount of dispersing agent is not critical, although some substantial amount such as at least about 5% by weight of the total composition should be present.

The preferred procedure for the application of these defoaming agents to industrial processes subject to undesirable foaming conditions comprises (1) the formation of a dilute aqueous finely divided dispersion of the defoaming agent and (2) application of this dilute dispersion at the point or just prior to the point where the undersirable foaming occurs in the particular process of interest. In making the dilute aqueous dispersion, several procedures may be employed. The most preferred procedure is as follows: A lump or briquette of the solid defoamer of Example 1 is added to the required amount of water at at least 70° C. with continuous vigorous agitation to yield a 1.5% aqueous dispersion. Agitation is continued for a period sufficiently long for the lumps to become melted and thoroughly dispersed. After a uniform dispersion has been obtained, the temperature is lowered to below the melting point of the primary ingredient of the defoamer (which is about 55° C. in the case of cetyl alcohol) by the addition of sufficient water to bring the final product to the preferred operation concentration of about 0.75%. The lowering of the temperature is a most important step since it provides a dispersion of solid crystals rather than liquid droplets or globules. This preferred procedure for making the dilute aqueous dispersion provides dispersions of the optimum effectiveness in the later use of the dispersion in a defoaming operation.

Other but less effective methods for making the dilute aqueous dispersion may be employed. Thus, an aqueous dispersion of about 0.75% concentration may be prepared in a single step by mixing the defoamer briquette with the total necessary amount of water at a temperature of at least 70° C. Dispersion of the solid defoamer at temperatures below 70° C. can also be made if the defoamer is first melted or dissolved in a suitable solvent such as isopropanol. Still further the solid defoamer may be melted and formed into aqueous pastes having a total solids content of 10% to 35% by first stirring the melted defoamer in warm water and continuing the stirring until cool. These pastes may then be diluted to the desired concentration for use in the defoaming operation.

In preparing the dilute dispersions of the solid defoamer as above indicated, maximum effectiveness is obtained only when soft water is used. This is particularly so when alkali metal or amine soaps of long chain fatty acids, for example, triethanolamine stearate, are used as emulsifiers. Soda ash may be used for softening the water; and when dispersion is carried out in two stages, dilution water so treated may be used for both stages. However, if the water hardness is inactivated by treatment with Sequestrene NA4 (the monohydrate of the tetrasodium salt of ethylenediamine tetraacetic acid) the Sequestrene NA4 equivalent to the hardness in the water for both stages can be added to the water for the first stage. This cannot be done with soda ash, but can be done with Sequestrene NA4 because the latter is not only a water softener by virtue of its sequestering the hardness, but is also a colloidal micelle modifier. Also the Sequestrene NA4 may be incorporated in the defoamer brick if desired. Soda ash cannot be so incorporated since the soda ash would react to too great an extent with free acid in the defoamer. Sequestrene NA4 in excess of the water hardness should be avoided, however, since an excess (for example, 5–10% of the defoamer weight) considerably lowers the defoamer efficiency.

Regardless of the method of forming the dilute aqueous dispersion of the defoamer the dispersion is applied at the point or prior to the point in the commercial process where undesirable foaming occurs. Although the solid defoamers of this invention and the aqueous dispersions thereof are not to be limited to use in the paper industry, it will be apparent that a highly desirable use for the same comprises addition thereof to a papermaking system comprising rosin sizes and alum at the usual pH for such systems. Additional uses in the paper industry and other industries will be readily apparent to those skilled in the art.

Compositions which are particularly preferred are those which utilize either stearic or palmitic acid as the fatty acid and either stearyl or cetyl alcohol as the alcohol.

This application is a continuation-in-part of my application Serial No. 196,079 filed November 16, 1950 which in turn is a continuation-in-part of my application Serial No. 158,595 filed April 27, 1950, both of which are now abandoned.

I claim:

1. A solid defoamer composition for combating foam in papermaking processes consisting essentially of from about 55% to about 72% of a higher aliphatic alcohol having a carbon chain of about 14 to 25 carbon atoms which is solid at room temperature and has a melting point below 100° C., from about 3% to about 25% of a higher aliphatic acid having a carbon chain of about 14 to 25 carbon atoms which is solid at room temperature and has a melting point below 100° C., and at least about 5%, based on the weight of the composition, and not more than 100%, based on the weight of the alcohol, of a dispersing agent, said three ingredients being uniformly intermixed.

2. A solid defoamer composition in accordance with claim 1 in which the higher aliphatic alcohol and the higher aliphatic acid each have carbon chains of about 16 to 18 carbon atoms.

3. A solid defoamer composition in accordance with claim 2 in which the amount of dispersing agent is up to about 50% of the weight of the alcohol.

4. A solid defoamer composition in accordance with claim 1 in which the higher aliphatic alcohol consists of a mixture of alcohols predominantly with a carbon chain of 16 to 18 carbon atoms and the higher aliphatic acid consists of a mixture of acids predominantly with a carbon chain of about 16 to 18 carbon atoms.

5. A solid defoamer composition in accordance with claim 1 in which the higher aliphatic alcohol consists essentially of cetyl alcohol together with minor amounts of other aliphatic alcohols having carbon chains of about 16 to 18 carbon atoms and the higher aliphatic acid consists essentially of stearic acid together with minor amounts of other aliphatic acids having carbon chains of about 16 to 18 carbon atoms.

6. A solid defoamer composition in accordance with claim 1 in which the higher aliphatic alcohol consists essentially of stearyl alcohol together with minor amounts of other aliphatic alcohols having carbon chains of about 16 to 18 carbon atoms and the higher aliphatic acid consists essentially of stearic acid together with minor amounts of other aliphatic acids having carbon chains of about 16 to 18 carbon atoms.

7. A solid defoamer composition in accordance with claim 1 in which the dispersing agent is an amine soap of a higher fatty acid.

8. A solid defoamer composition in accordance with claim 1 in which the dispersing agent is an alkali metal soap of a higher fatty acid.

9. A solid defoamer composition in accordance with claim 5 in which the amount of dispersing agent is up to about 50% of the weight of the alcohol.

10. A solid defoamer composition for combating foam in papermaking processes consisting of a water-dispersible solid block of unit amount comprising essentially about 60% by weight of a higher aliphatic alcohol which is predominantly cetyl alcohol, about 15% by weight of a higher aliphatic acid which is predominantly stearic acid, and about 25% by weight of the soap of triethanolamine and said acid, the three ingredients being uniformly intermixed in the solid composition.

11. A solid defoamer composition for combating foam in papermaking processes consisting of a water-dispersible solid block of unit amount comprising essentially about 60% by weight of a higher aliphatic alcohol which is predominantly stearyl alcohol, about 15% by weight of a higher aliphatic acid which is predominantly stearic acid, and about 25% by weight of the soap of triethanolamine and said acid, the three ingredients being uniformly intermixed in the solid composition.

12. A solid defoamer composition for combating foam in papermaking processes consisting of a water-dispersible solid block of unit amount comprising essentially about 60% to 72% by weight of a higher aliphatic alcohol consisting of a mixture of alcohols predominantly with a carbon chain of 16 to 18 carbon atoms, about 3% to 25% by weight of a higher aliphatic acid which is a mixture of acids predominantly with a carbon chain of about 16 to 18 carbon atoms which is solid at room temperature and has a melting point below 100° C. and about 25% by weight of the soap of triethanolamine and said acid, the three ingredients being uniformly intermixed in the solid composition.

References Cited in the file of this patent

FOREIGN PATENTS

| 429,423 | Great Britain | May 24, 1935 |
| 568,510 | Great Britain | Apr. 9, 1945 |

OTHER REFERENCES

Chemical Industries, May 1949, pages 757–759, article by Ross, entitled "Chemical Antifoaming Agents."

Emulsion, booklet of Carbide and Carbon Chem. Corp., New York, N. Y., 4th ed. (1934), pages 6 and 7.